US012728755B2

(12) United States Patent
Sohmshetty et al.

(10) Patent No.: US 12,728,755 B2
(45) Date of Patent: Sep. 8, 2026

(54) SYSTEMS AND METHODS FOR CONTROLLING VEHICLE MOVEMENT IN A PARKING LOT

(71) Applicant: Ford Global Technologies, LLC, Dearborn, MI (US)

(72) Inventors: Raj Sohmshetty, Canton, MI (US); Yifan Chen, Ann Arbor, MI (US); Smruti Panigrahi, Novi, MI (US); Hussein Chami, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 832 days.

(21) Appl. No.: 18/177,984

(22) Filed: Mar. 3, 2023

(65) Prior Publication Data

US 2024/0294087 A1 Sep. 5, 2024

(51) Int. Cl.

| | |
|---|---|
| ***B60L 53/65*** | (2019.01) |
| ***B60L 53/35*** | (2019.01) |
| ***G08G 1/14*** | (2006.01) |

(52) U.S. Cl.

CPC ............... *B60L 53/65* (2019.02); *B60L 53/35* (2019.02); *G08G 1/141* (2013.01); *G08G 1/148* (2013.01); *B60L 2240/62* (2013.01)

(58) Field of Classification Search

CPC ...... B60L 53/65; B60L 53/35; B60L 2240/62; G08G 1/141; G08G 1/148; G08G 1/142; G08G 1/146

See application file for complete search history.

(56) References Cited

U.S. PATENT DOCUMENTS

| | | | | |
|---|---|---|---|---|
| 8,058,841 | B2 * | 11/2011 | Chander | B65H 75/4402 320/115 |
| 8,279,088 | B2 * | 10/2012 | Khim | G08G 1/065 705/13 |
| 9,770,993 | B2 * | 9/2017 | Zhao | B60L 53/51 |
| 10,549,645 | B2 * | 2/2020 | Zhao | B60L 53/14 |
| 10,596,920 | B2 * | 3/2020 | Arregui Torres | B60L 53/126 |
| 10,699,574 | B1 * | 6/2020 | Zeryihun | G08G 1/147 |
| 11,820,246 | B2 * | 11/2023 | Donnelly | B60L 53/36 |
| 11,881,108 | B2 * | 1/2024 | Barrett | G08G 1/015 |

(Continued)

FOREIGN PATENT DOCUMENTS

| | | | | |
|---|---|---|---|---|
| CN | 214202660 U | * | 9/2021 | |
| CN | 113870602 A | * | 12/2021 | G08G 1/0969 |

(Continued)

*Primary Examiner* — Jared Fureman
(74) *Attorney, Agent, or Firm* — Burris Law, PLLC

(57) ABSTRACT

A method includes obtaining parking lot data associated with the parking lot, where the parking lot data indicates an availability of a plurality of parking spaces of the parking lot and obtaining vehicle data associated with the plurality of vehicles, where the vehicle data includes one or more physical characteristics of each of the plurality of vehicles, one or more electrical charging characteristics of each of the plurality of vehicles, or a combination thereof. The method includes dynamically defining one or more parking characteristics of the parking lot based on the vehicle data and the parking lot data and controlling a movement of the plurality of vehicles via the exit lane, the entry lane, and the one or more charging lanes based on the vehicle data and the one or more parking characteristics of the parking lot.

20 Claims, 17 Drawing Sheets

(56) References Cited

U.S. PATENT DOCUMENTS

| | | | | |
|---|---|---|---|---|
| 12,077,059 | B2 * | 9/2024 | Salter | B60L 53/36 |
| 12,136,344 | B2 * | 11/2024 | Diamond | B60L 58/16 |
| 12,240,341 | B1 * | 3/2025 | Pathipati | B60L 53/39 |
| 2011/0131083 | A1 * | 6/2011 | Redmann | G07F 17/24<br>705/13 |
| 2011/0140658 | A1 * | 6/2011 | Outwater | B60L 53/35<br>320/109 |
| 2012/0112929 | A1 * | 5/2012 | Gupta | G08G 1/146<br>340/932.2 |
| 2014/0354229 | A1 * | 12/2014 | Zhao | B60L 53/68<br>320/109 |
| 2016/0352113 | A1 * | 12/2016 | Zhao | H02J 7/80 |
| 2017/0032583 | A1 * | 2/2017 | Moran | G08G 1/065 |
| 2019/0205842 | A1 * | 7/2019 | Starns | G05D 1/0088 |
| 2020/0211071 | A1 * | 7/2020 | Rosas-Maxemin | G06Q 30/0284 |
| 2022/0055491 | A1 * | 2/2022 | Labell | B60L 53/30 |
| 2022/0134893 | A1 | 5/2022 | Liu et al. | |
| 2023/0053922 | A1 * | 2/2023 | Borrelli | G01C 21/3492 |
| 2023/0145508 | A1 | 5/2023 | Kaphengst et al. | |
| 2023/0237852 | A1 * | 7/2023 | Kim | G06Q 10/047 |
| 2024/0051527 | A1 * | 2/2024 | Yuan | G08G 1/146 |
| 2024/0123974 | A1 * | 4/2024 | Zhang | H04W 4/44 |
| 2024/0278675 | A1 * | 8/2024 | Zhao | B60L 53/65 |

FOREIGN PATENT DOCUMENTS

| | | | |
|---|---|---|---|
| KR | 102442678 | 9/2022 | |
| WO | WO-2015114592 A1 * | 8/2015 | G08G 1/143 |
| WO | 2020011411 | 1/2020 | |

* cited by examiner

SYSTEMS AND METHODS FOR CONTROLLING VEHICLE MOVEMENT IN A PARKING LOT

FIELD

The present disclosure relates to systems and methods for controlling vehicle movement in a parking lot.

BACKGROUND

The statements in this section merely provide background information related to the present disclosure and may not constitute prior art.

During or upon completion of a manufacturing process for an electric vehicle, the electric vehicle can be temporarily positioned at various locations in a manufacturing environment, such as a parking lot. Furthermore, the battery of a completed electric vehicle may need to be charged to a predetermined level before shipping. As such, one or more charging stations for the electric vehicles may be provided to charge the electric vehicle as the electric vehicles navigate within the manufacturing environment. As an example, and upon completion of a manufacturing process for the electric vehicle, a control system may control the movement of the electric vehicle to a parking lot and/or to a charging station to receive an electrical charge prior to being temporarily positioned the parking lot. However, controlling the movement of multiple electric vehicles through various charging stations to efficiently charge the electric vehicles and maintain the electrical charge of the vehicles is a resource and time intensive task. Furthermore, significant amounts of labor and infrastructure are needed to efficiently move the vehicles to and from various parking lots and/or other locations within the manufacturing environment. These issues related to controlling the movement of multiple electric vehicles through various charging stations and a parking lot, among other issues, are addressed by the present disclosure.

SUMMARY

This section provides a general summary of the disclosure and is not a comprehensive disclosure of its full scope or all of its features.

The present disclosure provides a method for managing a plurality of vehicles of a parking lot, where the parking lot includes, an exit lane, an entry lane, and one or more charging lanes. The method includes obtaining parking lot data associated with the parking lot, where the parking lot data indicates an availability of a plurality of parking spaces of the parking lot and obtaining vehicle data associated with the plurality of vehicles, where the vehicle data includes one or more physical characteristics of each of the plurality of vehicles, one or more electrical charging characteristics of each of the plurality of vehicles, or a combination thereof. The method includes dynamically defining one or more parking characteristics of the parking lot based on the vehicle data and the parking lot data and controlling a movement of the plurality of vehicles via the exit lane, the entry lane, and the one or more charging lanes based on the vehicle data and the one or more parking characteristics of the parking lot.

The following paragraph includes variations of the method of the above paragraph, and the variations may be implemented individually or in any combination.

In one form, the one or more physical characteristics of each of the plurality of vehicles comprises a vehicle type of each of the plurality of vehicles, a vehicle width of each of the plurality of vehicles, a vehicle length of each of the plurality of vehicles, or a combination thereof. In one form, the one or more electrical charging characteristics of each of the plurality of vehicles comprises an amount of electrical energy of each of the plurality of vehicles, a charging time of each of the plurality of vehicles, a position of a charging port of each of the plurality of vehicles, or a combination thereof. In one form, the one or more parking characteristics of the parking lot comprises one or more parking space widths of the plurality of parking spaces, one or more parking space lengths of the plurality of parking spaces, a number of the plurality of parking spaces, an arrangement of the plurality of parking spaces, or a combination thereof. In one form, the method further includes obtaining charging station data associated with a plurality of charging stations disposed proximate to the one or more charging lanes and determining, based on the one or more electrical charging characteristics of the vehicle data, whether a given vehicle from among the plurality of vehicles has a given amount of electrical energy that is less than a threshold amount of electrical energy. The method includes, in response to determining that the given amount of electrical energy is less than the threshold amount of electrical energy: identifying a given charging station from among the plurality of charging stations based on the charging station data and controlling a movement of the given vehicle to travel to the given charging station along a given path defined by the exit lane and the one or more charging lanes. In one form, the method further includes, in response to determining that the given amount of electrical energy is less than the threshold amount of electrical energy: identifying one or more impeding vehicles from among the plurality of vehicles based on a set of parking spaces from among the plurality of parking spaces, where the set of parking spaces are associated with the given vehicle, and controlling a movement of the one or more impeding vehicles along a taxi path defined by one of the exit lane and the entry lane. In one form, the method includes, in response to determining that the given amount of electrical energy is less than the threshold amount of electrical energy: obtaining robot data associated with a plurality of robots, where the robot data indicates a positional characteristic of each of the plurality of robots of each of the plurality of robots, identifying a given robot from among the plurality of robots based on the robot data, and controlling a movement of the given robot to travel along the one or more charging lanes to the given charging station. In one form, the one or more charging lanes include a gantry, and where controlling the movement of the given robot further comprises broadcasting a command to the given robot to travel along the gantry proximate to the given charging station. In one form, the given robot is a mobile robot, and where controlling the movement of the mobile robot further comprises broadcasting a command to the mobile robot to autonomously travel along the one or more charging lanes proximate to the given charging station. In one form, the method further includes determining whether a given parking space from among the plurality of parking spaces is available based on the parking lot data, and controlling, in response to determining the given parking space is available, a movement of a given vehicle from among the plurality of vehicles to travel to the given parking space along a given path defined by the entry lane, the one or more charging lanes, or a combination thereof. In one form, the method further includes identifying one or more impeding vehicles from among the plurality of vehicles based on a set of parking spaces from among the plurality of parking spaces, where the set of parking spaces are associated with the given vehicle and controlling a movement of the one or more impeding vehicles and the given vehicle along a parking operation path defined by the exit lane, the entry lane, or a combination thereof.

The present disclosure provides a system for managing a plurality of vehicles of a parking lot, where the parking lot includes, an exit lane, an entry lane, and one or more charging lanes, the system comprising. The system includes one or more processors and one or more nontransitory computer-readable mediums comprising instructions that are executable by the one or more processors. The instructions include obtaining parking lot data associated with the parking lot, where the parking lot data indicates an availability of a plurality of parking spaces of the parking lot, and obtaining vehicle data associated with the plurality of vehicles, where the vehicle data includes one or more physical characteristics of each of the plurality of vehicles and one or more electrical charging characteristics of each of the plurality of vehicles, where the one or more physical characteristics of each of the plurality of vehicles comprises a vehicle type of each of the plurality of vehicles, a vehicle width of each of the plurality of vehicles, a vehicle length of each of the plurality of vehicles, or a combination thereof, and the one or more electrical charging characteristics of each of the plurality of vehicles comprises an amount of electrical energy of each of the plurality of vehicles, a position of a charging port of each of the plurality of vehicles, a charging time of each of the plurality of vehicles, or a combination thereof. The instructions include dynamically defining one or more parking characteristics of the parking lot based on the vehicle data and the parking lot data, where the one or more parking characteristics of the parking lot comprises one or more parking space widths of the plurality of parking spaces, one or more parking space lengths of the plurality of parking spaces, a number of the plurality of parking spaces, an arrangement of the plurality of parking spaces, or a combination thereof. The instructions include controlling a movement of the plurality of vehicles via the exit lane, the entry lane, and the one or more charging lanes based on the vehicle data and the one or more parking characteristics of the parking lot.

The following paragraph includes variations of the system of the above paragraph, and the variations may be implemented individually or in any combination.

In one form, the instructions include obtaining charging station data associated with a plurality of charging stations disposed proximate to the one or more charging lanes and determining, based on the one or more electrical charging characteristics of the vehicle data, whether a given vehicle from among the plurality of vehicles has a given amount of electrical energy that is less than a threshold amount of electrical energy. The instructions include, in response to determining that the given amount of electrical energy is less than the threshold amount of electrical energy: identifying a given charging station from among the plurality of charging stations based on the charging station data and controlling a movement of the given vehicle to travel to the given charging station along a given path defined by the exit lane and the one or more charging lanes. In one form, the instructions further comprise, in response to determining that the given amount of electrical energy is less than the threshold amount of electrical energy: identifying one or more impeding vehicles from among the plurality of vehicles based on a set of parking spaces from among the plurality of parking spaces, where the set of parking spaces are associated with the given vehicle and controlling a movement of the one or more impeding vehicles along a taxi path defined by one of the exit lane and the entry lane. In one form, the instructions further comprise, in response to determining that the given amount of electrical energy is less than the threshold amount of electrical energy: obtaining robot data associated with a plurality of robots, where the robot data indicates a positional characteristic of each of the plurality of robots of each of the plurality of robots, identifying a given robot from among the plurality of robots based on the robot data, and controlling a movement of the given robot to travel along the one or more charging lanes to the given charging station. In one form, the instructions further comprise: determining whether a given parking space from among the plurality of parking spaces is available based on the parking lot data and controlling, in response to determining the given parking space is available, a movement of a given vehicle from among the plurality of vehicles to travel to the given parking space along a given path defined by the entry lane, the one or more charging lanes, or a combination thereof. In one form, the instructions further comprise: identifying one or more impeding vehicles from among the plurality of vehicles based on a set of parking spaces from among the plurality of parking spaces, where the set of parking spaces are associated with the given vehicle and controlling a movement of the one or more impeding vehicles and the given vehicle along a parking operation path defined by the exit lane, the entry lane, or a combination thereof.

The present disclosure provides a method for managing a plurality of vehicles of a parking lot, where the parking lot includes, an exit lane, an entry lane, and one or more charging lanes. The method includes obtaining parking lot data associated with the parking lot, where the parking lot data indicates an availability of a plurality of parking spaces of the parking lot, and obtaining vehicle data associated with the plurality of vehicles, where the vehicle data includes one or more physical characteristics of each of the plurality of vehicles and one or more electrical charging characteristics of each of the plurality of vehicles, where the one or more physical characteristics of each of the plurality of vehicles comprises a vehicle type of each of the plurality of vehicles, a vehicle width of each of the plurality of vehicles, a vehicle length of each of the plurality of vehicles, or a combination thereof, and where the one or more electrical charging characteristics of each of the plurality of vehicles comprises an amount of electrical energy of each of the plurality of vehicles, a position of a charging port of each of the plurality of vehicles, a charging time of each of the plurality of vehicles, or a combination thereof. The method includes dynamically defining one or more parking characteristics of the parking lot based on the vehicle data and the parking lot data, where the one or more parking characteristics of the parking lot comprises one or more parking space widths of the plurality of parking spaces, one or more parking space lengths of the plurality of parking spaces, a number of the plurality of parking spaces, an arrangement of the plurality of parking spaces, or a combination thereof. The method includes controlling a movement of the plurality of vehicles via the exit lane, the entry lane, and the one or more charging lanes based on the vehicle data and the one or more parking characteristics of the parking lot.

The following paragraph includes variations of the method of the above paragraph, and the variations may be implemented individually or in any combination.

In one form, the method further includes obtaining charging station data associated with a plurality of charging stations disposed proximate to the one or more charging lanes and determining, based on the one or more electrical charging characteristics of the vehicle data, whether a given vehicle from among the plurality of vehicles has a given amount of electrical energy that is less than a threshold amount of electrical energy. The method further includes, in response to determining that the given amount of electrical energy is less than the threshold amount of electrical energy: identifying a given charging station from among the plurality of charging stations based on the charging station data and controlling a movement of the given vehicle to travel to the given charging station along a given path defined by the exit lane and the one or more charging lanes. In one form, the method further includes determining whether a given parking space from among the plurality of parking spaces is available based on the parking lot data and controlling, in response to determining the given parking space is available, a movement of a given vehicle from among the plurality of vehicles to travel to the given parking space along a given path defined by the entry lane, the one or more charging lanes, or a combination thereof.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1A:
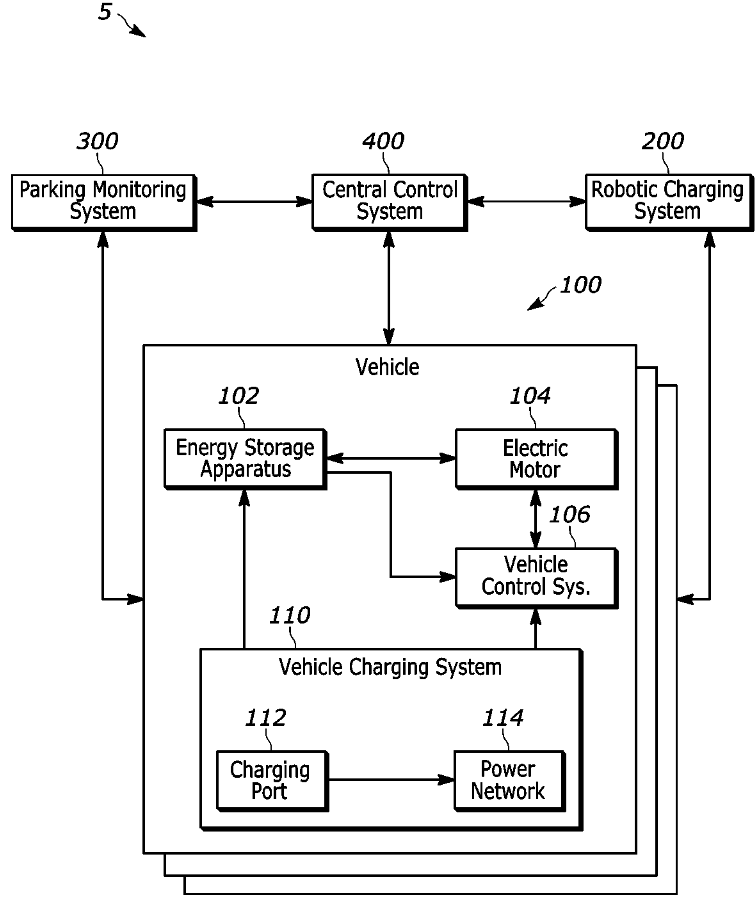
FIG. 1A is a functional block diagram of an example manufacturing environment in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides systems and methods for method for managing a plurality of vehicles of a parking lot, where the parking lot includes, an exit lane, an entry lane, and one or more charging lanes. A central control system obtains parking lot data associated with the parking lot and vehicle data associated with the plurality of vehicles. The central control system dynamically defines one or more parking characteristics of the parking lot based on the vehicle data and the parking lot data. The central control system controls a movement of the plurality of vehicles via the exit lane, the entry lane, and the one or more charging lanes based on the vehicle data and the one or more parking characteristics of the parking lot. As such, the central control system efficiently controls the movement, temporary storage, and charging operations of the vehicles by managing the assignment and movement of the vehicles and the robots to various charging stations and parking spaces. Furthermore, the central control system dynamically defines parking spaces within a parking lot to adapt to the types of vehicles traveling within, into, or outside of the manufacturing environment.

Referring to FIG. 1A, a manufacturing environment 5 is shown and generally includes a plurality of vehicles 100, a robotic charging system 200, a parking monitoring system 300, and a central control system 400. It should be understood that any one of the modules of the vehicles 100, the robotic charging system 200, the parking monitoring system 300, and the central control system 400 can be provided at the same location or distributed at different locations (e.g., via one or more edge computing devices) and communicably coupled accordingly. In one form, the vehicles 100, the robotic charging system 200, the parking monitoring system 300, and the central control system 400 are communicably coupled using a wireless communication protocol (e.g., a Bluetooth®-type protocol, a cellular protocol, a wireless fidelity (Wi-Fi)-type protocol, a near-field communication (NFC) protocol, an ultra-wideband (UWB) protocol, among others).

In one form, the manufacturing environment 5 includes one or more production locations and post-production locations. As used herein, the "production location" refers to any location within the manufacturing environment 5 in which the vehicles 100 are subjected to a manufacturing process or transformation. As used herein, the "post-production location" refers to any location within the manufacturing environment 5 in which the vehicles 100 can be positioned when the vehicles 100 exit the production location and/or prior to being transported externally from the manufacturing environment 5 (e.g., prior to being transported to a dealership).

Figure 1B:
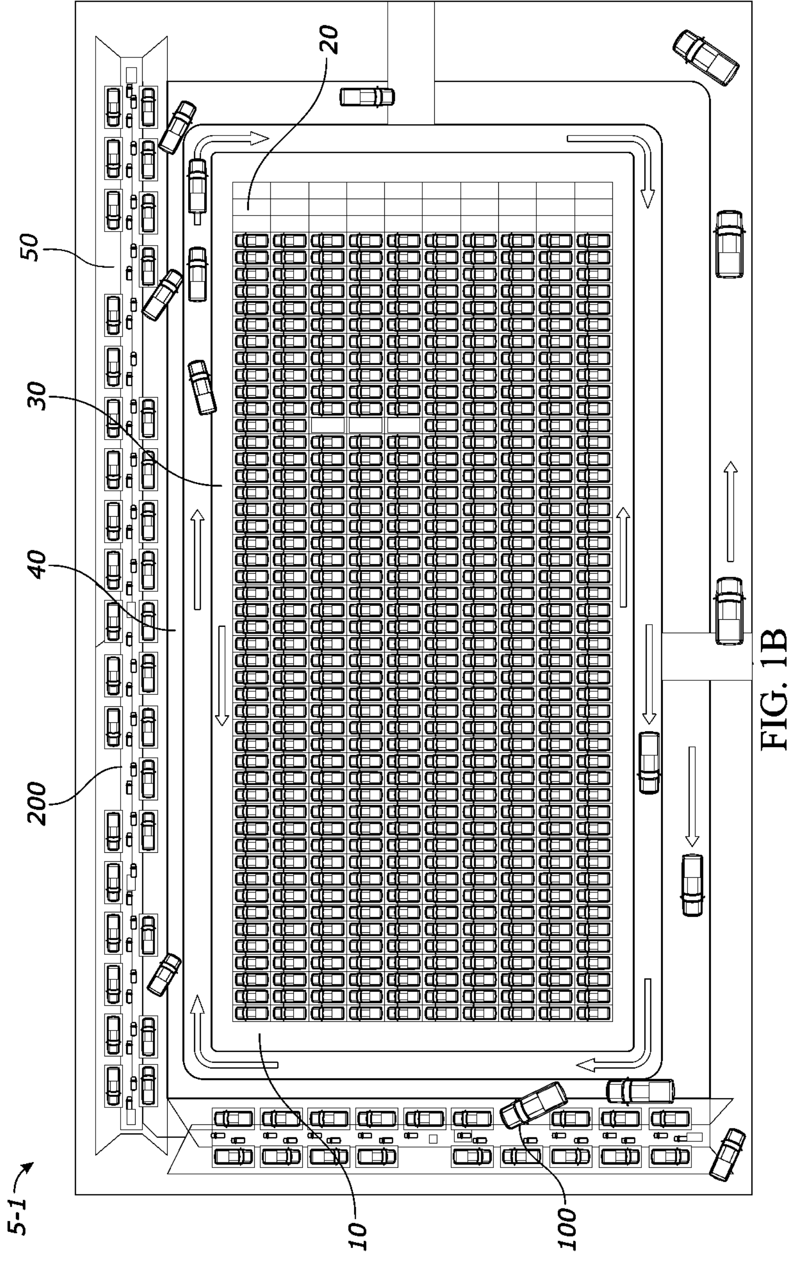
FIG. 1B is a schematic illustration of a parking lot provided within an example manufacturing environment of FIG. 1A in accordance with the teachings of the present disclosure.

As an example, and as shown in FIG. 1B, manufacturing environment 5-1 (as the manufacturing environment 5) includes a parking lot 10 (as the post-production location), which includes a plurality of parking spaces 20, an exit lane 30 (i.e., a lane for exiting from the plurality of parking spaces 20 and entering another area of the manufacturing environment 5 or exiting the manufacturing environment 5), an entry lane 40 (i.e., a lane for entering into the plurality of parking spaces 20 from another area of the manufacturing environment 5), and a plurality of charging lanes 50 in which the robotic charging systems 200 are at least partially disposed. In this example, the exit lane 30, the entry lane 40, and the charging lanes 50 surround the parking lot 10.

Figure 1C:
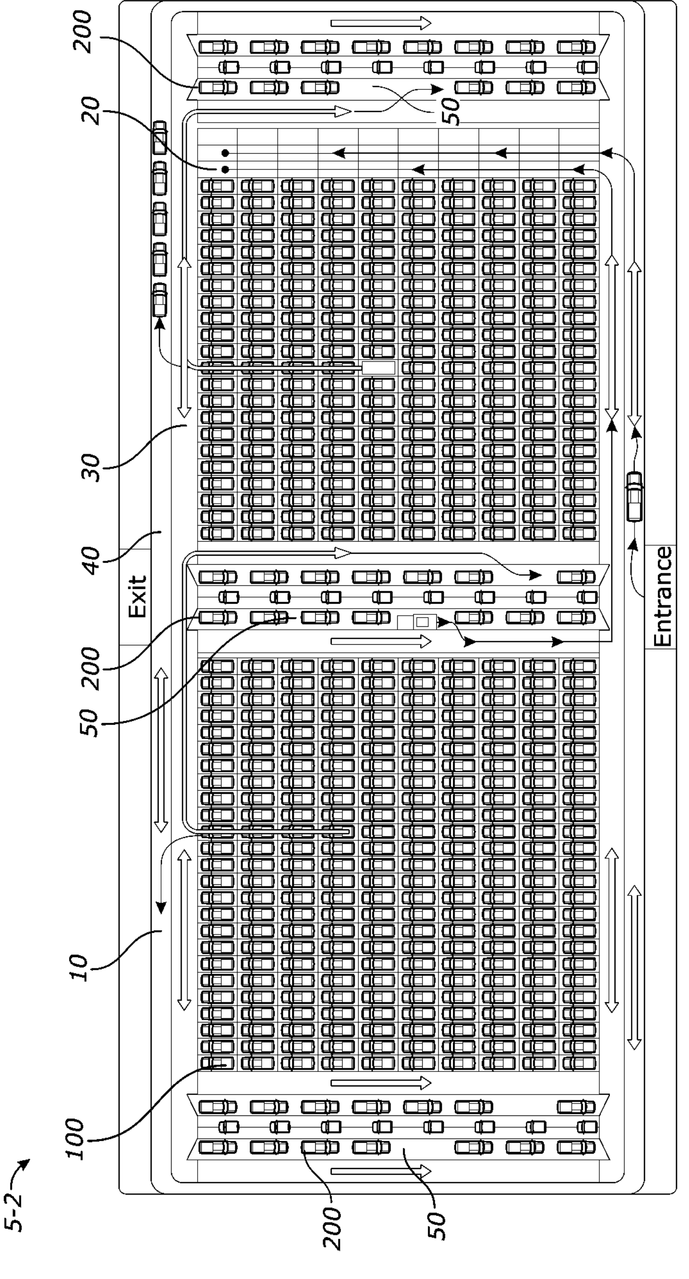
FIG. 1C is a schematic illustration of another parking lot provided within an example manufacturing environment of FIG. 1A in accordance with the teachings of the present disclosure.

As another example and as shown in FIG. 1C, manufacturing environment 5-2 (as the manufacturing environment 5) includes the parking lot 10 (as the post-production location), which includes the plurality of parking spaces 20, the exit lane 30, the entry lane 40, and the charging lanes 50. In this example, the exit lane 30 and the entry lane 40 surround the charging lanes 50 and the parking lot 10, and at least a set of the charging lanes 50 are provided between multiple sets of the parking spaces 20. It should be understood that the exit lane 30, the entry lane 40, and the charging lanes 50 can have varying arrangements relative to the parking lot 10 and is not limited to the example described herein.

In one form and referring to FIG. 1A, the vehicles 100 are provided by electric vehicles. As used herein, "electric vehicle" refers to a vehicle that employs one or more electric motors for propulsion. Example electric vehicles include, but are not limited to, electric-only vehicles (EVs) and hybrid electric vehicles (HEVs). In one form, the vehicles 100 may be provided by autonomous or semi-autonomous vehicles that are configured to perform one or more known autonomous routines within the manufacturing environment 5, such as an autonomous navigation routine, a driver assistance routine, an adaptive cruise control routine, an autonomous braking routine, and/or an object detection routine. It should be understood that the vehicles 100 may be provided by other types of vehicles and are not limited to the examples described herein.

In one form, the vehicles 100 may each include an electric motor 104 that employs electrical energy stored in an energy storage apparatus 102, such as one or more vehicle batteries, to perform one or more propulsion-based operations. In one form, the vehicles 100 includes a vehicle control system 106 that is configured to control and/or monitor a particular system or subsystem of the vehicle 100. As an example, the vehicle control system 106 may include a propulsion control module for controlling the operation of the electric motor 104, a powertrain control module for controlling operation of a powertrain system of the vehicle 100, a transmission control module for controlling operation of a transmission system of the vehicle 100, a brake control module for controlling operation of a braking system of the vehicle 100, a body control module for controlling the operation of various electronic accessories in the body of the vehicle 100, a climate control module for controlling operation of a heating and air conditioning system of the vehicle 100, and a suspension control module for controlling operation of a suspension system of the vehicle 100, among other vehicle modules. In one form, the electric motor 104, the energy storage apparatus 102, and the vehicle control system 106 are communicably coupled by a vehicle interface, such as a control system area network (CAN) bus, a local interconnect network (LIN) bus, and/or a clock extension peripheral interface (CXPI) bus.

In one form, the vehicle control system 106 is configured to provide vehicle data associated with the given vehicle 100 to the central control system 400. Additional details regarding the vehicle control system 106 and the vehicle data are provided below with reference to FIG. 3A.

In one form, the vehicles 100 may each include a vehicle charging system 110 that is configured to receive electrical energy from the robotic charging system 200. The vehicle charging system 110 may include a charging port cover (not shown), a charging port 112, and a power network 114. In one form, the charging port cover is configured to physically isolate the charging port 112 and the power network 114 from an ambient environment of the vehicle 100 and may be provided by, for example, a door or cap.

In one form, the charging port 112 provides an electrical interface for physically and electrically/inductively coupling an electric charger of the robotic charging system 200 to the power network 114. As an example, the charging port 112 is provided by a charging receptacle (e.g., an electrical outlet) that receives one or more conductive components of the electric charger. As another example, the charging port 112 is provided by a charging pad (e.g., a wireless power transfer pad comprising one or more inductive coils) that is configured to inductively and physically couple to a charging pad of the electric charger.

In one form, the power network 114 selectively adjusts one or more characteristics of the electric signal received from the robotic charging system 200 and provides the adjusted signal to the energy storage apparatus 102. As an example, the power network 114 includes an alternating current-alternating current (AC-AC) converter circuit that is configured to adjust an amplitude and/or frequency component of an AC electric signal, such as a voltage source inverter, a current source inverter, a cycloconverter, a matrix converter, among other AC-AC converter circuits. As another example, the power network 114 includes an ACdirect current (AC-DC) converter circuit that is configured to convert the AC electric signal into a DC electric signal, such as a rectifier circuit and/or other AC-DC converter circuits. As an additional example, the power network 114 includes a DC-AC converter circuit that is configured to convert the DC electric signal into an AC electric signal, such as an inverter circuit and/or other DC-AC converter circuits. As yet another example, the power network 114 includes a DC-DC converter circuit that is configured to adjust an amplitude of the DC electric signal, such as a buck converter circuit, a boost converter circuit, a buck-boost converter circuit, among other DC-DC converter circuits.

Figure 2A:
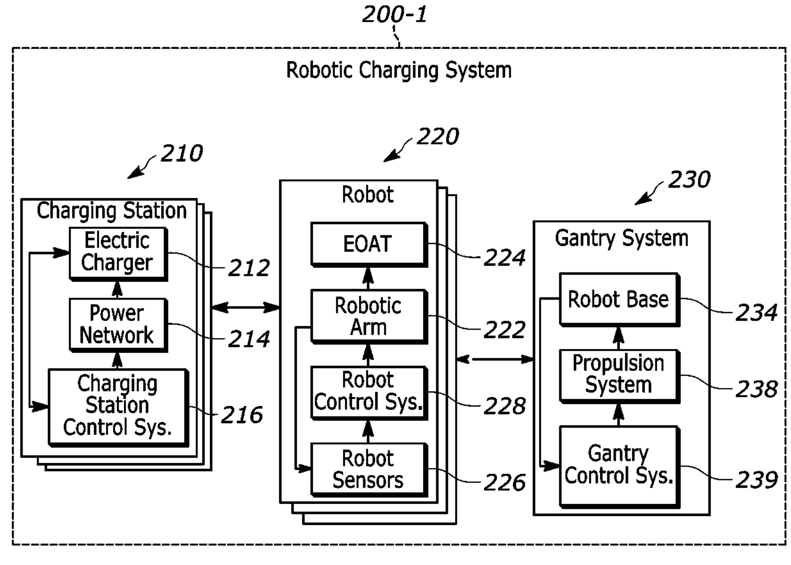
FIG. 2A is a functional block diagram of a robotic charging system of the example manufacturing environment of FIG. 1A in accordance with the teachings of the present disclosure.
Figure 2B:
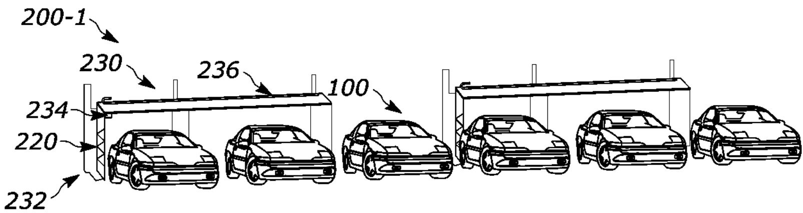
FIG. 2B is a schematic illustration of the example robotic charging system of FIG. 2A in accordance with the teachings of the present disclosure.

Referring to FIGS. 2A-2B, a robotic charging system 200-1 (as the robotic charging system 200) is shown and includes a plurality of charging stations 210, a plurality of robots 220, and a gantry system 230. In one form, the charging stations 210 are configured to provide electrical energy to the vehicles 100 during a charging routine and include an electric charger 212, a power network 214, and a charging station control system 216. In one form, the electric charger 212 is electrically coupled to a power grid via the power network 214 and may include a conductive cable (e.g., a Level 4 DC fast charger cable) and a charging interface for physically and electrically/inductively coupling to the power network 114 via the charging port 112, such as a plug or a wireless charging pad. In one form, the power network 214 is configured to adjust one or more characteristics of the electrical power output by the grid and provide the adjusted electrical power to the energy storage apparatus 102 via the charging port 112 and the power network 114. As an example, the power network 214 may include similar circuits and converter networks as the power network 114, and as such, the description thereof is omitted for brevity.

In one form, the charging station control system 216 is configured to provide charging station data associated with the given charging stations 210 to the central control system 400. Additional details regarding the charging station control system 216 and the charging station data are provided below with reference to FIG. 3.

In one form, the robots 220 include a robotic arm 222, an end of arm tool (EOAT) 224, robot sensors 226, and a robot control system 228 configured to control the robotic arm 222 and the EOAT 224 to perform one or more automated tasks. Example automated tasks include, but are not limited to, retrieving the electric charger 212 from the charging stations 210 and moving the electric charger 212 proximate to the vehicle 100 (e.g., the charging port 112), removing the charging port cover to insert the electric charger 212 into the charging port 112, among other automated tasks. Additional details regarding the control of the robotic arm 222 and/or the EOAT 224 are disclosed in U.S. patent application Ser. No. 18/177,954, and titled "ROBOTIC ARM ASSEMBLY FOR ELECTRIC VEHICLE CHARGER," which is commonly owned with the present application and the contents of which are incorporated herein by reference in its entirety.

In one form, the robotic arm 222 is a multi-axis robotic arm having various portions that are rotatable about various axes (e.g., a six-axis robot having five degrees of freedom). In one form, the EOAT 224 includes one or more components for performing the automated tasks described herein, such as an image/vision sensor, a hook, and a gripper. Additional details regarding the one or more components of the EOAT 224 and the arrangement thereof are disclosed in patent application Ser. No. 18/177,954, and titled "ROBOTIC ARM ASSEMBLY FOR ELECTRIC VEHICLE CHARGER," which is commonly owned with the present application and the contents of which are incorporated herein by reference in its entirety.

In one form, the robot sensors 226 generate data corresponding to various characteristics of the robot 220. As an example, the robot sensors 226 may include a power sensor to generate power information (e.g., information regarding amount of current and/or voltage being applied by a power source to the robot 220), a torque sensor configured to generate torque information of various joints of the robot 220, and/or a touch sensor at a handle of the robot 220 configured to detect contact. The robot sensors 226 are configured to provide the corresponding data to the robot control system 228 for controlling the robotic arm 222 and/or EOAT 224.

In one form, the robot control system 228 is configured to provide robot data associated with the robot 220 to the central control system 400. Additional details regarding the robot control system 228 and the robot data are provided below with reference to FIG. 3A.

In one form, the gantry system 230 includes a structural base 232, a robot base 234, a plurality of tracks 236, a propulsion system 238, and a gantry control system 239. The structural base 232 is secured to the floor and is configured to physically support the robot base 234 and the plurality of tracks 236, which are generally disposed above the ground and/or within the one or more charging lanes 50 (i.e., an overhead gantry). In one variation, the structural base 232 is secured to the ceiling, wall, or other infrastructure element within the manufacturing environment 5, and the robot base 234 and the tracks 236 are suspended therefrom such that they are disposed above the ground. In one form, the robot base 234 is secured to the robot 220, disposed within a recess defined by the tracks 236, and moveable along the tracks 236 (e.g., slidably moveable via a plurality of wheels of the robot base 234) such that the robot 220 can initiate the charging routine at any one of the charging stations 210. In one form, the tracks 236 have a one-dimensional, two-dimensional, or three-dimensional arrangement to enable the robot base 234 to move along various axes. In one form, the propulsion system 238 includes various known components for moving the robot base 234 and the attached robot 220 along the plurality of tracks 236. As an example, the propulsion system 238 includes drive motors, cable carriers, electrically conductive wires, and other known components that are employed for moving the robot base 234 and the attached robot 220 along the plurality of tracks 236.

In one form, the central control system 400 is configured to control the operation of the robotic charging system 200-1. As an example, the central control system 400 obtains robot data associated with the robots 220, vehicle data associated with the vehicles 100, and charging station data associated with the charging stations 210. Furthermore, the central control system 400 determines whether the vehicles 100 have an amount of electrical energy stored in the corresponding energy storage apparatus 102 that is less than a threshold amount, and the central control system 400 instructs a selected robot 220 and the vehicle 100 to navigate to a selected charging station 210 to thereby perform the charging routine. Additional details regarding controlling the operation of the robotic charging system 200-1 are provided below with reference to FIG. 3A.

Figure 2C:
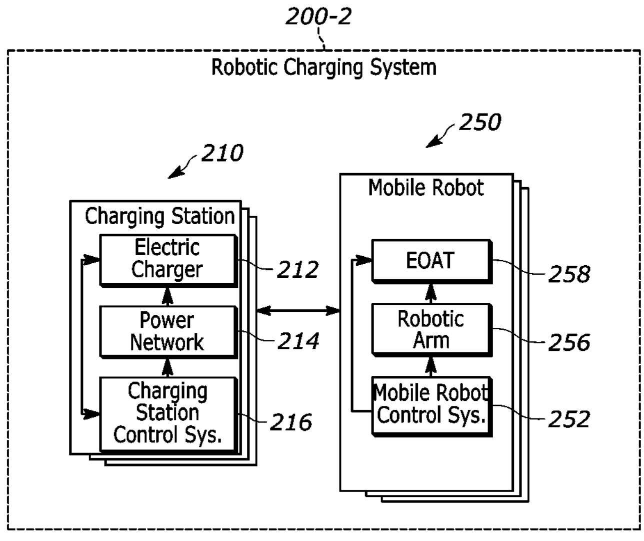
FIG. 2C is a functional block diagram of another robotic charging system of the example manufacturing environment of FIG. 1A in accordance with the teachings of the present disclosure.
Figure 2D:
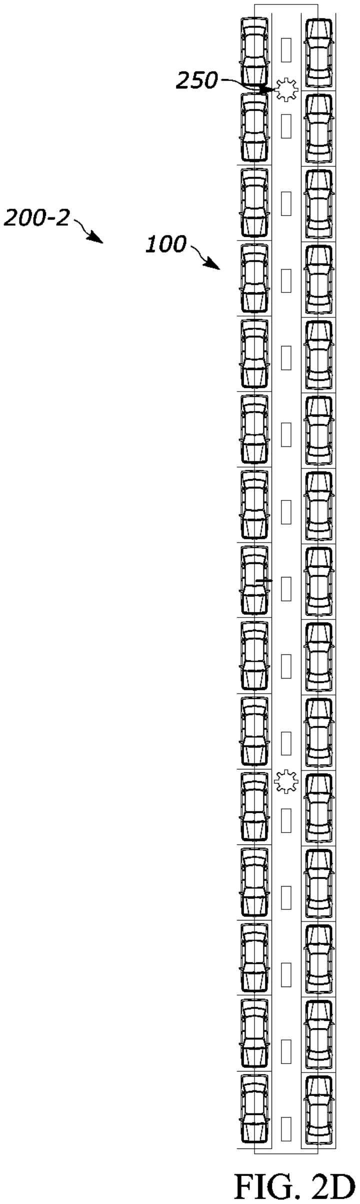
FIG. 2D is a schematic illustration of the example robotic charging system of FIG. 2C in accordance with the teachings of the present disclosure.

Referring to FIGS. 2C-2D, a robotic charging system 200-2 (as the robotic charging system 200) is shown. The robotic charging system 200-2 is similar to the robotic charging system 200-1, except that the robots 220 and the gantry system 230 are replaced with a plurality of mobile robots 250. In one form, the mobile robots 250 are configured to autonomously move to various locations of the manufacturing environment 5, as instructed by the central control system 400. To autonomously move itself, a mobile robot control system 252 is configured to control various movement systems of the mobile robot 250 (e.g., propulsion systems, steering systems, and/or brake systems) via actuators and based on one or more navigation sensors (e.g., a global navigation satellite system (GNSS) sensor, an image sensor, a local position sensor, among others). Furthermore, the mobile robot control system 252 is configured to operate the actuators to control the motion of one or more robotic arms 256 and an EOAT 258 attached thereto and thereby perform one or more automated tasks. Example automated tasks include, but are not limited to, autonomously traveling to a given charging stations 210 identified by the central control system 400, retrieving the electric charger 212 from the charging stations 210 and moving the electric charger 212 proximate to the vehicle 100 (e.g., the charging port 112), removing the charging port cover to insert the electric charger 212 into the charging port 112, among other automated tasks.

Figure 3A:
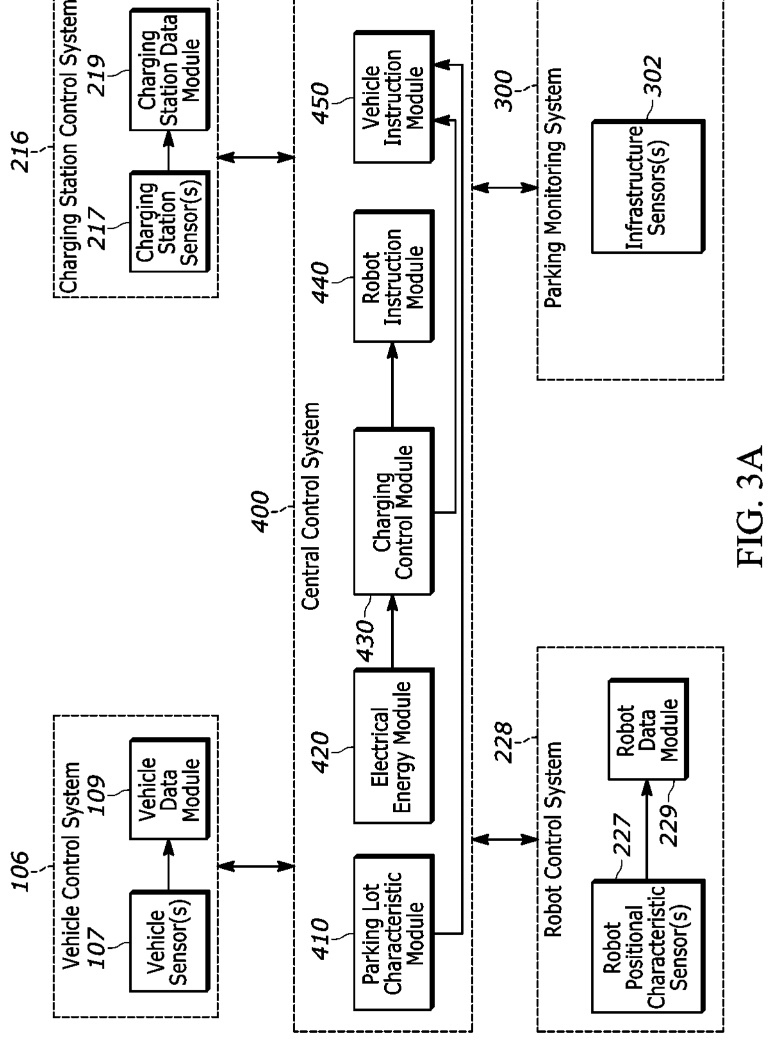
FIG. 3A is a functional block diagram of a parking monitoring system and a central control system of the example manufacturing environment of FIG. 1A in accordance with the teachings of the present disclosure.

Referring to FIG. 3A, a functional block diagram of the vehicle control system 106, the charging station control system 216, the robot control system 228, the parking monitoring system 300, and the central control system 400. In one form, the vehicle control system 106 includes one or more vehicle sensors 107 and a vehicle data module 109, and the charging station control system 216 includes one or more charging station sensors 217 and a charging station data module 219. In one form, the robot control system 228 includes one or more robot positional characteristic sensors 227 and a robot data module 229.

The one or more vehicle sensors 107 and/or the vehicle data module 109 are configured to generate and broadcast vehicle data associated with the respective vehicle 100 to the central control system 400 via the wireless communication protocol. The vehicle data may indicate one or more electrical charging characteristics of the vehicle 100, one or more positional characteristics of the vehicle 100, and/or one or more physical characteristics of the vehicle 100.

As an example, the one or more vehicle sensors 107 may include known positional characteristic sensors that measure the one or more positional characteristics of the vehicle 100, such as a location of the vehicle 100, a trajectory of the vehicle 100, and/or an orientation of the vehicle 100. As a more specific example, the positional characteristic sensors may include a location sensor (e.g., a GNSS sensor, an NFC sensor, or UWB sensor) configured to generate information indicative of the location and/or trajectory of the vehicle 100 and/or a gyroscope configured to generate information indicative of the orientation of the vehicle 100.

As another example, the one or more vehicle sensors 107 may include known electrical charge sensors that measure the one or more electrical charging characteristics, such as an amount of electrical energy stored within the energy storage apparatus 102 of the vehicle 100 and/or a charging time of the vehicle 100 (e.g., an amount of time to charge the vehicle 100 to a predetermined energy level of the energy storage apparatus 102).

As an additional example, the vehicle data module 109 stores and broadcasts identifying features of the vehicle 100 (e.g., vehicle-identification-number, and/or other characteristics that uniquely identify the vehicle 100), a corresponding position of the charging port 112 of the vehicle 100 (as the electrical characteristic), and one or more physical characteristics of the vehicle 100. The one or more physical characteristics of the vehicle 100 may include, but are not limited to, a vehicle type of the vehicle 100, a vehicle width of the vehicle 100, and/or a vehicle length of the vehicle 100.

In one form, the one or more charging station sensors 217 and/or the charging station data module 219 are configured to generate and broadcast charging station data associated the respective charging stations 210 to the central control system 400 via the wireless communication protocol. The charging station data may indicate an availability of the charging station 210, such as the charging station being in an available state (e.g., one of the vehicles 100 is not provided within the charging stations 210 and a charging routine is currently not being performed at the given charging station 210) or an unavailable state (e.g., one of the vehicles 100 is provided within the charging stations 210 and/or a charging routine is currently being performed at the given charging station 210). As an example, the one or more charging station sensors 217 include one or more proximity sensors (e.g., a camera, an infrared sensor, a radar scanner, a laser scanner, a LIDAR sensor, an ultrasonic sensor, among other proximity sensors) configured to generate information indicating whether one of the vehicles 100 is within an area defined by the given charging station 210. As another example, the one or more charging stations sensors 217 include one or more known electrical charging state sensors that generate information indicating whether the electric charger 212 is electrically coupled to the vehicle charging system 110.

In one form, the one or more robot positional characteristic sensors 227 and the robot data module 229 generate and broadcast robot data associated with the respective robot 220 to the central control system 400 via a wireless communication protocol. The robot data may indicate one or more positional characteristics of the respective robot 220, such as a location of the robot 220, a trajectory of the robot 220, and/or an orientation of the robot 220. As an example, the one or more robot positional characteristic sensors 227 may include a location sensor (e.g., an NFC sensor or UWB sensor) configured to generate location information of the robot 220. As another example, the one or more robot positional characteristic sensors 227 may include an accelerometer, a gyroscope, and/or a magnetometer configured to generate orientation information of the robot 220. As yet another example, the one or more robot positional characteristic sensors 227 may include a velocity sensor configured to generate velocity information of the robot 220.

Figure 3B:
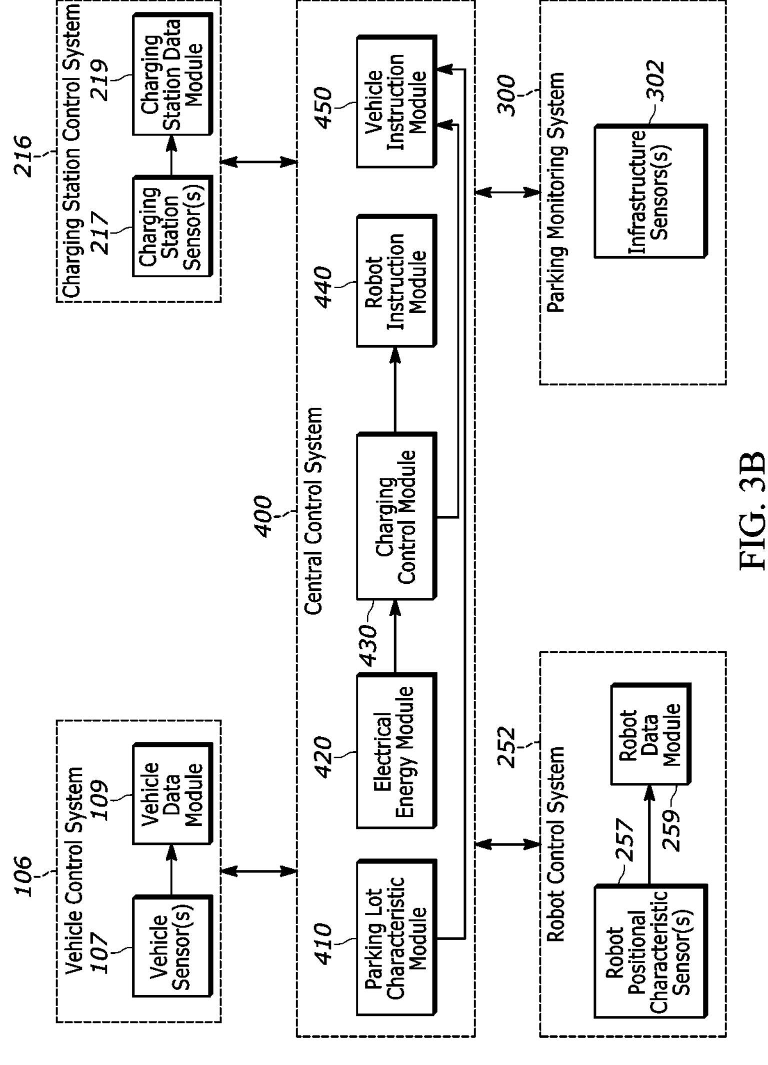
FIG. 3B is another functional block diagram of a parking monitoring system and a central control system of the example manufacturing environment of FIG. 1A in accordance with the teachings of the present disclosure.

Referring to FIG. 3B, a functional block diagram of the vehicle control system 106, the charging station control system 216, the mobile robot control system 252, and the central control system 400 is shown. As described above, the robotic charging system 200-2 is similar to the robotic charging system 200-1, except that the robot control system 228 is replaced with the mobile robot control system 252. In one form, the mobile robot control system 252 includes one or more robot positional characteristic sensors 257 and a robot data module 259 that generate and broadcast the robot data associated with the mobile robot 250 to the central control system 400 via a wireless communication protocol. In one form, the one or more robot positional characteristic sensors 135 and the robot data module 259 are similar to the one or more robot positional characteristic sensors 227 and the robot data module 229, respectively.

Referring to FIGS. 3A-3B, the parking monitoring system 300 includes one or more infrastructure sensors 302. In one form, the one or more infrastructure sensors 302 are configured to obtain parking lot data of the parking lot 10. As an example, the one or more infrastructure sensors 302 include image sensors (e.g., a two-dimensional camera, a three-dimensional camera, an infrared sensor, a radar scanner, a laser scanner, a LIDAR sensor, an ultrasonic sensor, among others) that obtain image data (as the parking lot data) of the parking lot 10. As described below in further detail, the central control system 400 is configured to dynamically define one or more parking characteristics of the parking lot 10 based on the parking lot data.

Figure 4A:
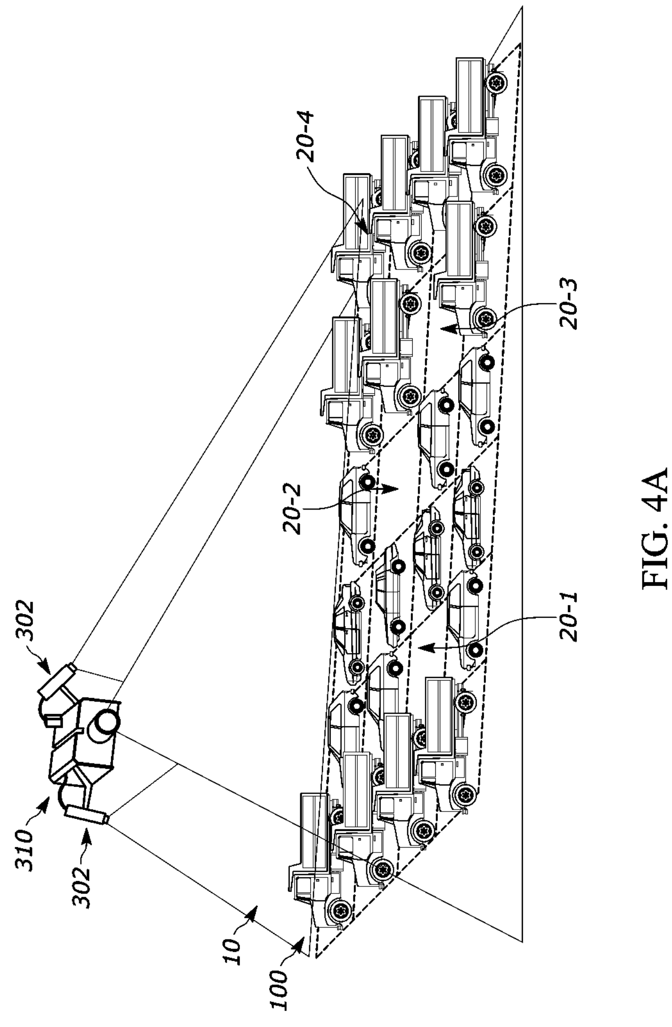
FIG. 4A is a schematic illustration of a parking monitoring system defining one or more parking characteristics of a plurality of parking spaces of a parking lot in accordance with the teachings of the present disclosure.

In one form, the infrastructure sensors 302 are disposed on an infrastructure element within the parking lot 10, such as a tower, a light pole, a building, a sign, an automated guided vehicle, among others fixed and/or moveable elements. As an example, and as shown in FIG. 4A, the one or more infrastructure sensors 302 are attached or secured to a drone 310 that is configured to autonomously navigate within the manufacturing environment 5 to obtain the parking lot data of the parking lot 10 (e.g., image data of the parking lot 10). It should be understood that the drone 310 may be replaced by other autonomous vehicles or fixed infrastructure elements in other variations and is not limited to the example described herein.

Referring to FIGS. 3A-3B, the central control system 400 includes a parking lot characteristic module 410, an electrical energy module 420, a charging control module 430, a robot instruction module 440, and a vehicle instruction module 450. In one form, the central control system 400 obtains the vehicle data from the vehicle control system 106, the charging station data from the charging station control system 216, the robot data from the robot control system 228 and/or the mobile robot control system 252, and the parking lot data from the parking monitoring system 300. Furthermore, the central control system 400 is configured to dynamically define one or more parking characteristics of the parking lot 10, control the operation of the robots 220/mobile robots 250 and the charging stations 210, and control the movement of the vehicles 100 based on the vehicle data, the charging station data, the robot data, and/or the parking lot data.

Parking Lot Control

In one form, the parking lot characteristic module 410 dynamically defines one or more parking characteristics of parking lot 10 based on the vehicle data and the parking lot data. That is, the parking lot characteristic module 410 continuously defines the one or more parking characteristics as the vehicles 100 enter and/or exit the post-production location. In one form, the one or more parking characteristics include one or more parking space widths of the plurality of parking spaces, one or more parking space lengths of the plurality of parking spaces, a number of the plurality of parking spaces, an arrangement of the plurality of parking spaces, or a combination thereof.

As an example, the parking lot characteristic module 410 performs known image processing routines (e.g., a difference-based image processing routine, a semantic-based image processing routine, among other machine learning or computer vision routines) on the image data of the parking lot 10 (as the parking lot data) to detect a current availability of the plurality of parking spaces 20 and/or a current number of parking spaces 20 (e.g., a total number of parking spaces 20, a number of available and unavailable parking spaces, etc.). Additionally, the parking lot characteristic module 410 performs known image processing routines to determine the current dimensions of the parking spaces 20 (e.g., the parking space width and/or lengths) and/or a current arrangement of the parking spaces 20 (e.g., a shape of the parking spaces 20, a number of rows and columns formed by the parking spaces 20, among others).

As the vehicles 100 enter and exit the parking lot 10, the parking lot characteristic module 410 iteratively obtains the parking lot data and the vehicle data to dynamically update the one or more parking characteristics of the parking lot 10. In one form, the parking lot characteristic module 410 dynamically updates the one or more parking characteristics to accommodate the physical and/or electrical charging characteristics of the vehicles 100 to thereby increase the number of vehicles 100 that can be temporarily positioned within the parking lot 10.

Figure 4B:
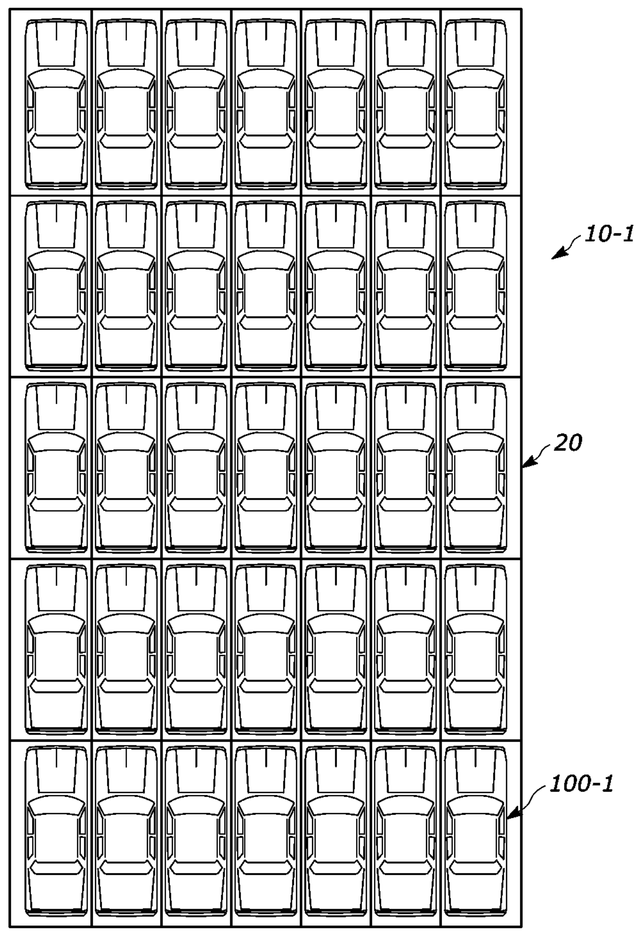
FIG. 4B is a schematic illustration of a parking monitoring system defining one or more parking characteristics of a plurality of parking spaces of a parking lot in accordance with the teachings of the present disclosure.

As an example, and as shown in FIG. 4B, the parking lot characteristic module 410 defines the characteristics of parking lot 10-1 to accommodate a plurality of first vehicles 100-1. Specifically, the parking lot characteristic module 410 defines the parking lot characteristics such that the parking spaces 20 form a 7×5 rectangular grid (i.e., the arrangement of the parking spaces 20) and that the parking spaces 20 define a length and width that is greater than the vehicle length and vehicle width of the first vehicles 100-1 (i.e., the physical characteristics of the first vehicles 100-1).

Figure 4C:
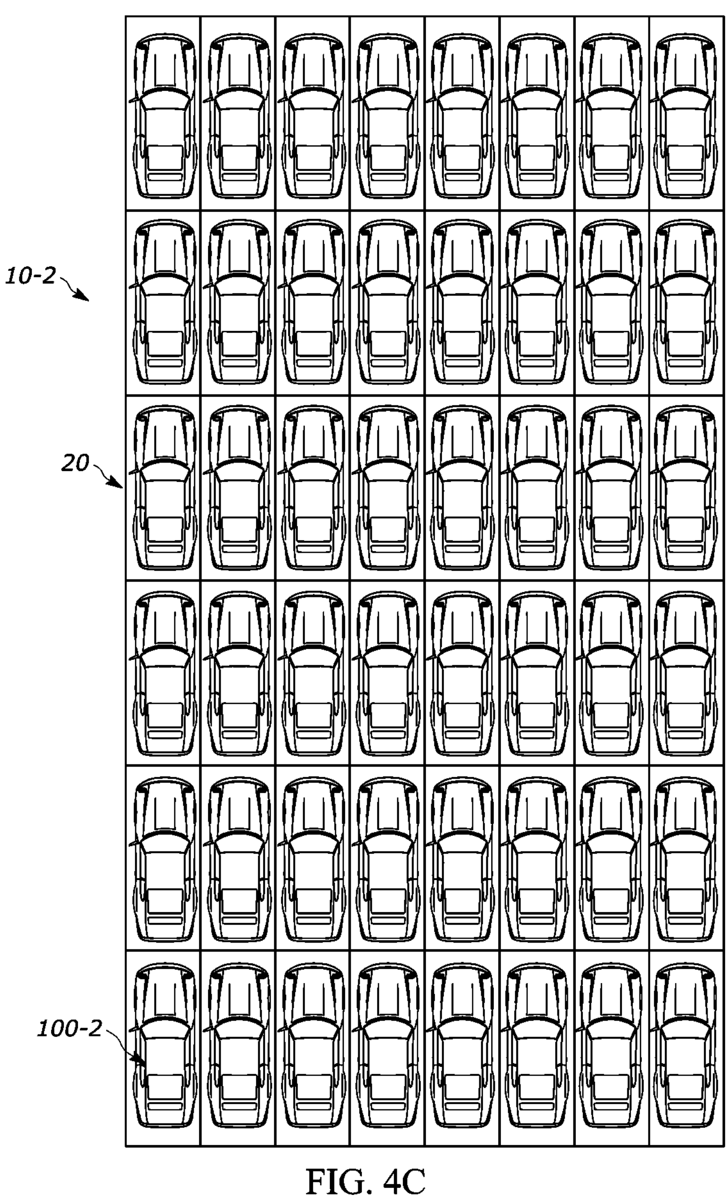
FIG. 4C is a schematic illustration of a parking monitoring system defining one or more parking characteristics of a plurality of parking spaces of a parking lot in accordance with the teachings of the present disclosure.

As another example and as shown in FIG. 4C, the parking lot characteristic module 410 defines the characteristics of parking lot 10-2 to accommodate a plurality of second vehicles 100-2. Specifically, the parking lot characteristic module 410 defines the parking lot characteristics such that the parking spaces 20 form an 8×6 rectangular grid (i.e., the arrangement of the parking spaces 20) and that the parking spaces 20 define a length and width that is greater than the vehicle length and vehicle width of the second vehicles 100-2 (i.e., the physical characteristics of the second vehicles 100-2).

Figure 4D:
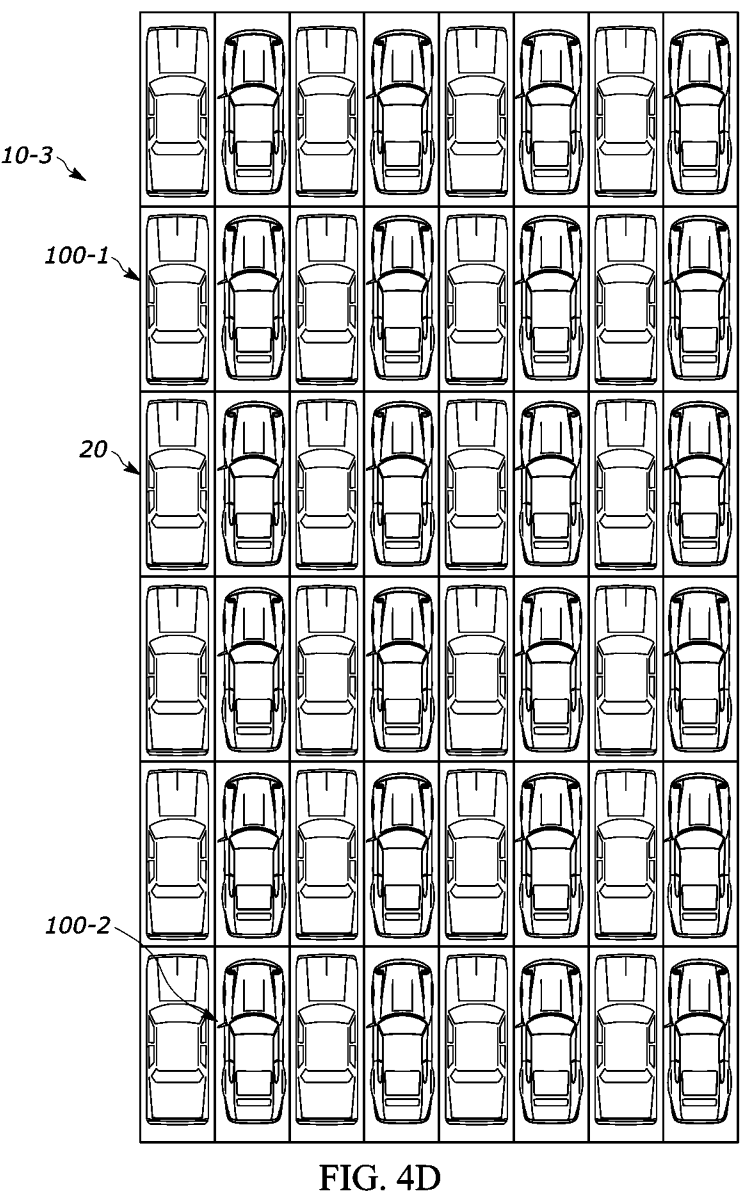
FIG. 4D is a schematic illustration of a parking monitoring system defining one or more parking characteristics of a plurality of parking spaces of a parking lot in accordance with the teachings of the present disclosure.

As an additional example and as shown in FIG. 4D, the parking lot characteristic module 410 defines the characteristics of parking lot 10-3 to accommodate both the first and second vehicles 100-1, 100-2. Specifically, the parking lot characteristic module 410 defines the parking lot characteristics such that the parking spaces 20 form a rectangular grid in which the first and second vehicles alternate by column (i.e., the arrangement of the parking spaces 20). Additionally, the parking lot characteristic module 410 defines the parking lot characteristics such that each parking space 20 within a given column defines a length and width that is greater than the vehicle length and vehicle width of assigned vehicle type (i.e., the physical characteristics of the first and second vehicles 100-1, 100-2).

Figure 4E:
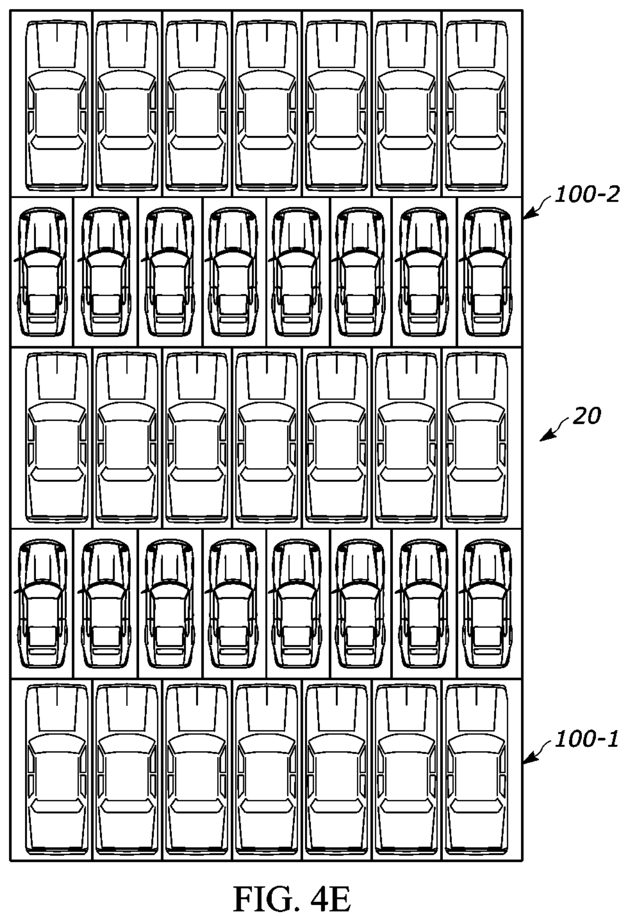
FIG. 4E is a schematic illustration of a parking monitoring system defining one or more parking characteristics of a plurality of parking spaces of a parking lot in accordance with the teachings of the present disclosure.

As yet another example and as shown in FIG. 4E, the parking lot characteristic module 410 defines the characteristics of parking lot 10-4 to accommodate both the first and second vehicles 100-1, 100-2. Specifically, the parking lot characteristic module 410 defines the parking lot characteristics such that the parking spaces 20 form a rectangular grid in which the first and second vehicles alternate by row (i.e., the arrangement of the parking spaces 20). Additionally, the parking lot characteristic module 410 defines the parking lot characteristics such that each parking space 20 within a given row defines a length and width that is greater than the vehicle length and vehicle width of assigned vehicle type (i.e., the physical characteristics of the first and second vehicles 100-1, 100-2).

Robot and Charging Station Control

In one form, the electrical energy module 420 determines whether one of the vehicles 100 has an amount of electrical energy that is less than a threshold amount of electrical energy based on the vehicle data. As an example, the threshold amount of electrical energy may be associated with an amount of electrical energy indicating that the vehicle 100 needs to be charged.

In one form, the charging control module 430 selects a given charging station from among the plurality of charging stations 210 and/or a given robot from among the robots 220 and/or mobile robots 250 for performing a charging routine in response the given vehicle having an amount of electrical energy that is less than the threshold amount of electrical energy. The charging control module 430 selects the given charging stations 210 for performing the charging routine based on the charging station data and/or the vehicle data, and the charging control module 430 selects the given robot for performing the charging routine based on the robot data.

As an example, the charging control module 430 selects the given charging station 210 as the charging station that is nearest (e.g., regarding units of distance or time) to the given vehicle 100 (as indicated by the location, trajectory, or orientation of the given vehicle 100) and that is in the available state (as indicated by the charging station data). Furthermore, the charging control module 430 selects the given robot 220 (or mobile robot 250) that is nearest to the selected charging station (as indicated by the robot data). It should be understood that other variations and/or combinations of the vehicle data, charging station data, and the robot data may be employed to select the given robot and the given charging stations 210 and are not limited to the examples described herein.

In one form, the robot instruction module 440 instructs the given robot to navigate to the given charging station 210. As an example, and referring to FIGS. 1B-1C, 2B, and 3A-3B, the robot instruction module 440 broadcasts a command to the given robot (e.g., one of the robots 220) to travel along the gantry that is disposed within one of the charging lanes 50 to the given charging stations 210. As another example and referring to FIGS. 1B-1C, 2D, and 3A-3B, the robot instruction module 440 broadcasts a command to the given robot (e.g., one of the mobile robots 250) to autonomously travel within the charging lane 50 and proximate to the given charging station 210.

In one form, the robot instruction module 440 instructs the given robot to initiate a charging routine when the given vehicle 100 and the given robot are proximate to (i.e., within and/or near) the given charging station 210. In some forms, the robot instruction module 440 includes a localization system that performs a localization routine to convert the vehicle location into a robot-based location, thereby enabling the robot instruction module 440 to define a robotic path between the electric charger 212 and the vehicle 100. Example localization systems are disclosed in U.S. patent application Ser. No. 18/177,964, and titled "SYSTEM AND METHOD FOR CHARGING ELECTRIC VEHICLES," which is commonly owned with the present application and the contents of which are incorporated herein by reference in its entirety. In response to defining the robotic path, the robot instruction module 440 broadcasts a command to the robot 220 to (i) retrieve the electric charger 212 from the charging station 210, (ii) move the electric charger 212 proximate to the vehicle 100 along the robotic path, (iii) open the charging port cover using the EOAT 224, and (iv) position the electric charger 212 proximate to the charging port 112 based on the robotic path to begin the charging routine.

Vehicle Movement Control

In one form, the vehicle instruction module 450 controls a movement of the vehicles 100 via the exit lane 30, the entry lane 40, and the charging lanes 50 based on the vehicle data and the one or more parking characteristics of the parking lot 10.

Figure 5A:
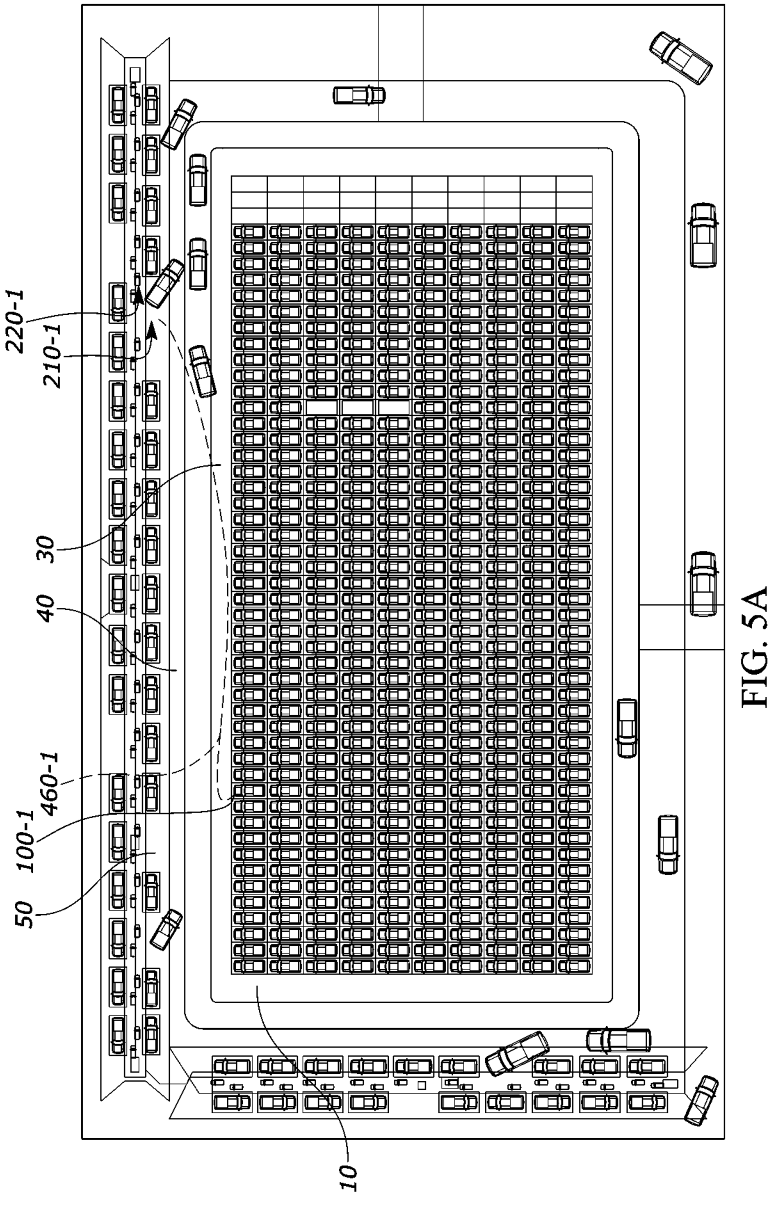
FIG. 5A is a schematic illustration of a parking lot provided within an example manufacturing environment of FIG. 1A in accordance with the teachings of the present disclosure.

As an example and referring to FIGS. 3-4 and 5A, when the vehicle data indicates that one of the vehicles 100 (e.g., vehicle 100-1 in FIG. 5A) has an amount of electrical energy that is less than the threshold amount of electrical energy, the charging control module 430 selects a given charging station from among the plurality of charging stations 210 (e.g., charging station 210-1 in FIG. 5A) and/or a given robot from among the robots 220 (e.g., robot 220-1 in FIG. 5A) for performing a charging routine, as described above. Subsequently, the vehicle instruction module 450 controls a movement of the given vehicle 100-1 to travel to the given charging station 210-1 along a path defined by the exit lane 30 one or more of the charging lanes 50 associated with the given charging station 210-1. As a more specific example, the vehicle instruction module 450 defines a path 460-1 between the given vehicle 100-1 and charging station 210-1 by performing known path planning routines and broadcasts one or more commands for autonomously controlling the vehicle 100-1 along the path by employing known autonomous navigation routines.

Figure 5B:
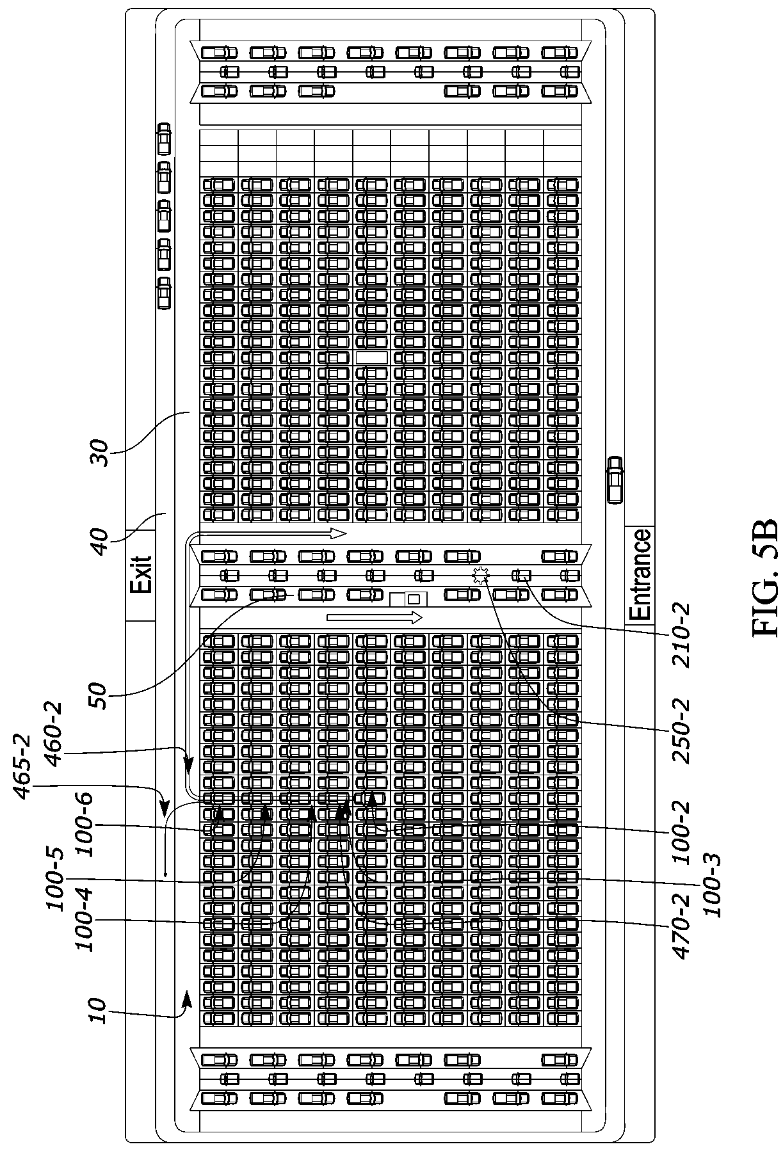
FIG. 5B is a schematic illustration of another parking lot provided within an example manufacturing environment of FIG. 1A in accordance with the teachings of the present disclosure.

As another example and referring to FIGS. 3-4 and 5B, when the vehicle data indicates that one of the vehicles 100 (e.g., vehicle 100-2 in FIG. 5B) has an amount of electrical energy that is less than the threshold amount of electrical energy, the charging control module 430 selects a given charging station from among the plurality of charging stations 210 (e.g., charging station 210-2 in FIG. 5B) and/or a given robot from among the mobile robots 250 (e.g., mobile robot 250-2 in FIG. 5B) for performing a charging routine, as described above. Subsequently, the vehicle instruction module 450 defines a path 460-2 between the given vehicle 100-2 and charging station 210-2 by performing known path planning routines, and the vehicle instruction module 450 identifies one or more impeding vehicles 100 (e.g., vehicles 100-3, 100-4, 100-5, 100-6 in FIG. 5B) based on a set of parking spaces 20-2 from among the parking spaces 20 that are along or proximate the path 460-2. More specifically, the vehicle instruction module 450 obtains the infrastructure sensor data from the one or more infrastructure sensors 302 to identify the set of parking spaces 470-2 and/or the impeding vehicles 100-3, 100-4, 100-5, 100-6.

In response to identifying the impeding vehicles 100-3, 100-4, 100-5, 100-6, the vehicle instruction module 450 defines a taxi path 465-2 for the impeding vehicles 100-3, 100-4, 100-5, 100-6 to thereby remove or inhibit instructions along the path 460-2 for the vehicle 100-2. Accordingly, the vehicle instruction module 450 initially broadcasts one or more commands for autonomously controlling the impeding vehicles 100-3, 100-4, 100-5 along the taxi path 465-2. Subsequently, the vehicle instruction module 450 broadcasts one or more commands for autonomously controlling the given vehicle 100-2 along the path 460-2 to the charging station 210-2 once the impeding vehicles 100-3, 100-4, 100-5 are not disposed along or proximate to the path 460-2 by employing known autonomous navigation routines.

Figure 5C:
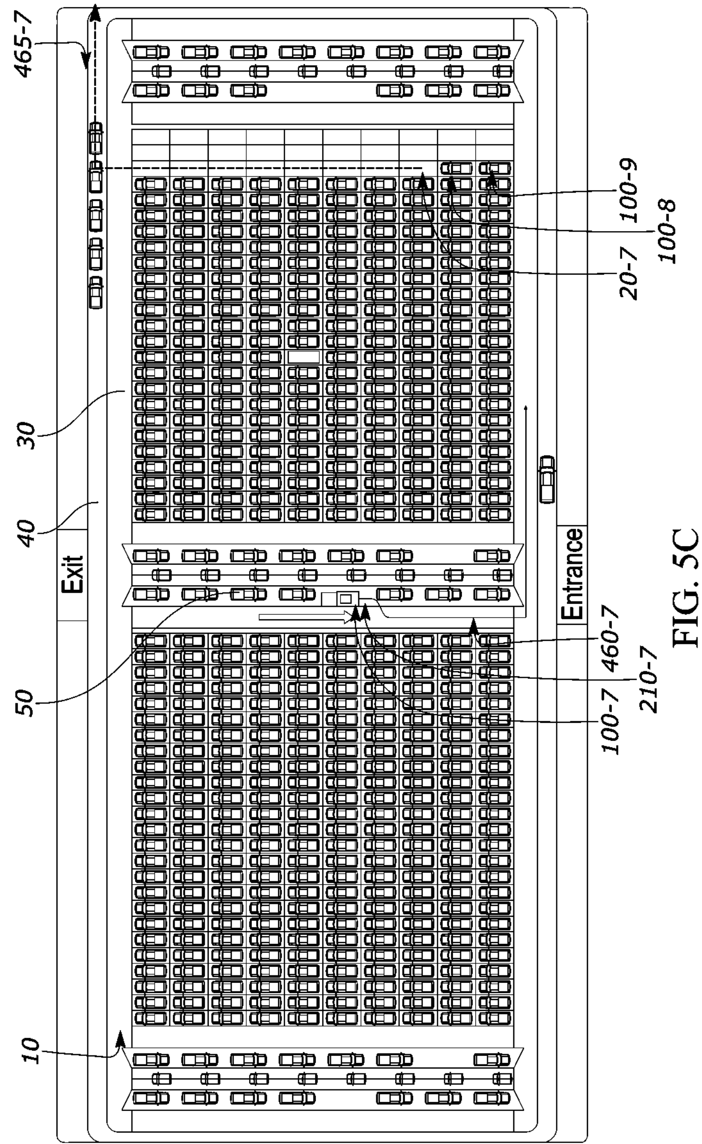
FIG. 5C is a schematic illustration of another parking lot provided within an example manufacturing environment of FIG. 1A in accordance with the teachings of the present disclosure.

As yet another example and referring to FIGS. 3-4 and 5C, when the vehicle data indicates that one of the vehicles 100 (e.g., vehicle 100-7 in FIG. 5C) has completed a charging operation at charging station 210-7, the vehicle instruction module 450 defines a path 460-7 between the given vehicle 100-7 and an available parking space 20-7 as indicated by the infrastructure sensor data. Subsequently, the vehicle instruction module 450 identifies one or more impeding vehicles 100 (e.g., vehicles 100-8, 100-9 in FIG. 5C) based on a set of parking spaces (e.g., parking spaces 20-7) that are adjacent or along the path 460-7. In response to identifying the impeding vehicles 100-8, 100-9, the vehicle instruction module 450 defines a taxi path 465-7 for the impeding vehicles 100-8, 100-9 to thereby remove or inhibit instructions along the path 460-7 for the vehicle 100-7. Accordingly, the vehicle instruction module 450 initially broadcasts one or more commands for autonomously controlling the impeding vehicles 100-8, 100-9 along the taxi path 465-7. Subsequently, the vehicle instruction module 450 broadcasts one or more commands for autonomously controlling the given vehicle 100-7 along the path 460-7 once the impeding vehicles 100-8, 100-9 are not disposed along or proximate to the path 460-7 by employing known autonomous navigation routines.

Accordingly, by collaboratively performing the parking lot control routines, charging station and robot control routines, and vehicle movement control routines described herein, the central control system 400 may dynamically define parking spaces and efficiently control the movement, temporary storage, and charging operations of the vehicles 100 while accommodating vehicles (and the characteristics thereof) traveling within, into, or outside of the manufacturing environment.

Figure 6:
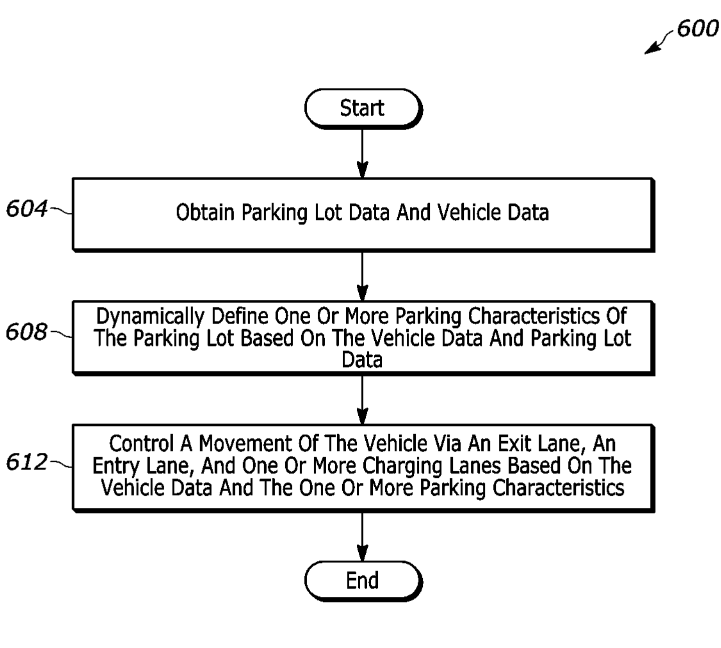
FIG. 6 is a flowchart of an example control routine in accordance with the teachings of the present disclosure.

With reference to FIG. 6, a flowchart illustrating an example routine 600 for managing the plurality of vehicles 100 of the parking lot 10 is shown. At 604, the central control system 400 obtains the parking lot data and the vehicle data. At 608, the central control system 400 dynamically defines one or more parking characteristics of the parking lot 10 based on the vehicle data and the parking lot data. At 612, the central control system 400 controls a movement of the vehicles 100 via the exit lane 30, the entry lane 40, and the one or more charging lanes 50 based on the vehicle data and the one or more parking characteristics.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for managing a plurality of vehicles of a parking lot, wherein the parking lot includes, an exit lane, an entry lane, and one or more charging lanes, the method comprising:

obtaining parking lot data associated with the parking lot, wherein the parking lot data indicates an availability of a plurality of parking spaces of the parking lot;

obtaining vehicle data associated with the plurality of vehicles, wherein the vehicle data includes one or more physical characteristics of each of the plurality of vehicles, one or more electrical charging characteristics of each of the plurality of vehicles, or a combination thereof;

dynamically defining one or more parking characteristics of the parking lot based on the vehicle data and the parking lot data, wherein dynamically defining the one or more parking characteristics comprises defining the plurality of parking spaces to form a grid arrangement in which parking space dimensions alternate by row or column based on vehicle types of the plurality of vehicles; and controlling a movement of the plurality of vehicles via the exit lane, the entry lane, and the one or more charging lanes based on the vehicle data and the one or more parking characteristics of the parking lot.

2. The method of claim 1, wherein the one or more physical characteristics of each of the plurality of vehicles comprises a vehicle type of each of the plurality of vehicles, a vehicle width of each of the plurality of vehicles, a vehicle length of each of the plurality of vehicles, or a combination thereof.

3. The method of claim 1, wherein the one or more electrical charging characteristics of each of the plurality of vehicles comprises an amount of electrical energy of each of the plurality of vehicles, a charging time of each of the plurality of vehicles, a position of a charging port of each of the plurality of vehicles, or a combination thereof.

4. The method of claim 1, wherein the one or more parking characteristics of the parking lot comprises one or more parking space widths of the plurality of parking spaces, one or more parking space lengths of the plurality of parking spaces, a number of the plurality of parking spaces, an arrangement of the plurality of parking spaces, or a combination thereof.

5. The method of claim 1 further comprising:

obtaining charging station data associated with a plurality of charging stations disposed proximate to the one or more charging lanes;

determining, based on the one or more electrical charging characteristics of the vehicle data, whether a given vehicle from among the plurality of vehicles has a given amount of electrical energy that is less than a threshold amount of electrical energy; and in response to determining that the given amount of electrical energy is less than the threshold amount of electrical energy:

identifying a given charging station from among the plurality of charging stations based on the charging station data; and controlling a movement of the given vehicle to travel to the given charging station along a given path defined by the exit lane and the one or more charging lanes.

6. The method of claim 5 further comprising, in response to determining that the given amount of electrical energy is less than the threshold amount of electrical energy:

identifying one or more impeding vehicles from among the plurality of vehicles based on a set of parking spaces from among the plurality of parking spaces, wherein the set of parking spaces are associated with the given vehicle; and controlling a movement of the one or more impeding vehicles along a taxi path defined by one of the exit lane and the entry lane.

7. The method of claim 5 further comprising, in response to determining that the given amount of electrical energy is less than the threshold amount of electrical energy:

obtaining robot data associated with a plurality of robots, wherein the robot data indicates a positional characteristic of each of the plurality of robots of each of the plurality of robots;

identifying a given robot from among the plurality of robots based on the robot data; and controlling a movement of the given robot to travel along the one or more charging lanes to the given charging station.

8. The method of claim 7, wherein the one or more charging lanes include a gantry, and wherein controlling the movement of the given robot further comprises broadcasting a command to the given robot to travel along the gantry proximate to the given charging station.

9. The method of claim 7, wherein the given robot is a mobile robot, and wherein controlling the movement of the mobile robot further comprises broadcasting a command to the mobile robot to autonomously travel along the one or more charging lanes proximate to the given charging station.

10. The method of claim 1 further comprising:

determining whether a given parking space from among the plurality of parking spaces is available based on the parking lot data; and controlling, in response to determining the given parking space is available, a movement of a given vehicle from among the plurality of vehicles to travel to the given parking space along a given path defined by the entry lane, the one or more charging lanes, or a combination thereof.

11. The method of claim 10 further comprising:

identifying one or more impeding vehicles from among the plurality of vehicles based on a set of parking spaces from among the plurality of parking spaces, wherein the set of parking spaces are associated with the given vehicle; and controlling a movement of the one or more impeding vehicles and the given vehicle along a parking operation path defined by the exit lane, the entry lane, or a combination thereof.

12. A system for managing a plurality of vehicles of a parking lot, wherein the parking lot includes, an exit lane, an entry lane, and one or more charging lanes, the system comprising:

one or more processors; and one or more nontransitory computer-readable mediums comprising instructions that are executable by the one or more processors, wherein the instructions comprise:

obtaining parking lot data associated with the parking lot, wherein the parking lot data indicates an availability of a plurality of parking spaces of the parking lot;

obtaining vehicle data associated with the plurality of vehicles, wherein the vehicle data includes one or more physical characteristics of each of the plurality of vehicles and one or more electrical charging characteristics of each of the plurality of vehicles, wherein:

the one or more physical characteristics of each of the plurality of vehicles comprises a vehicle type of each of the plurality of vehicles, a vehicle width of each of the plurality of vehicles, a vehicle length of each of the plurality of vehicles, or a combination thereof; and the one or more electrical charging characteristics of each of the plurality of vehicles comprises an amount of electrical energy of each of the plurality of vehicles, a position of a charging port of each of the plurality of vehicles, a charging time of each of the plurality of vehicles, or a combination thereof;

dynamically defining one or more parking characteristics of the parking lot based on the vehicle data and the parking lot data, wherein dynamically defining the one or more parking characteristics comprises defining the plurality of parking spaces to form a grid arrangement in which parking space dimensions alternate by row or column based on vehicle types of the plurality of vehicles, and wherein the one or more parking characteristics of the parking lot comprises one or more parking space widths of the plurality of parking spaces, one or more parking space lengths of the plurality of parking spaces, a number of the plurality of parking spaces, an arrangement of the plurality of parking spaces, or a combination thereof; and controlling a movement of the plurality of vehicles via the exit lane, the entry lane, and the one or more charging lanes based on the vehicle data and the one or more parking characteristics of the parking lot.

13. The system of claim 12, wherein the instructions further comprise:

obtaining charging station data associated with a plurality of charging stations disposed proximate to the one or more charging lanes;

determining, based on the one or more electrical charging characteristics of the vehicle data, whether a given vehicle from among the plurality of vehicles has a given amount of electrical energy that is less than a threshold amount of electrical energy; and in response to determining that the given amount of electrical energy is less than the threshold amount of electrical energy:

identifying a given charging station from among the plurality of charging stations based on the charging station data; and controlling a movement of the given vehicle to travel to the given charging station along a given path defined by the exit lane and the one or more charging lanes.

14. The system of claim 13, wherein the instructions further comprise, in response to determining that the given amount of electrical energy is less than the threshold amount of electrical energy:

identifying one or more impeding vehicles from among the plurality of vehicles based on a set of parking spaces from among the plurality of parking spaces, wherein the set of parking spaces are associated with the given vehicle; and controlling a movement of the one or more impeding vehicles along a taxi path defined by one of the exit lane and the entry lane.

15. The system of claim 13, wherein the instructions further comprise, in response to determining that the given amount of electrical energy is less than the threshold amount of electrical energy:

obtaining robot data associated with a plurality of robots, wherein the robot data indicates a positional characteristic of each of the plurality of robots of each of the plurality of robots;

identifying a given robot from among the plurality of robots based on the robot data; and controlling a movement of the given robot to travel along the one or more charging lanes to the given charging station.

16. The system of claim 12, wherein the instructions further comprise:

determining whether a given parking space from among the plurality of parking spaces is available based on the parking lot data; and controlling, in response to determining the given parking space is available, a movement of a given vehicle from among the plurality of vehicles to travel to the given parking space along a given path defined by the entry lane, the one or more charging lanes, or a combination thereof.

17. The system of claim 16, wherein the instructions further comprise:

identifying one or more impeding vehicles from among the plurality of vehicles based on a set of parking spaces from among the plurality of parking spaces, wherein the set of parking spaces are associated with the given vehicle; and controlling a movement of the one or more impeding vehicles and the given vehicle along a parking operation path defined by the exit lane, the entry lane, or a combination thereof.

18. A method for managing a plurality of vehicles of a parking lot, wherein the parking lot includes, an exit lane, an entry lane, and one or more charging lanes, the method comprising:

obtaining parking lot data associated with the parking lot, wherein the parking lot data indicates an availability of a plurality of parking spaces of the parking lot;

obtaining vehicle data associated with the plurality of vehicles, wherein the vehicle data includes one or more physical characteristics of each of the plurality of vehicles and one or more electrical charging characteristics of each of the plurality of vehicles, wherein:

the one or more physical characteristics of each of the plurality of vehicles comprises a vehicle type of each of the plurality of vehicles, a vehicle width of each of the plurality of vehicles, a vehicle length of each of the plurality of vehicles, or a combination thereof; and the one or more electrical charging characteristics of each of the plurality of vehicles comprises an amount of electrical energy of each of the plurality of vehicles, a position of a charging port of each of the plurality of vehicles, a charging time of each of the plurality of vehicles, or a combination thereof;

dynamically defining one or more parking characteristics of the parking lot based on the vehicle data and the parking lot data, wherein dynamically defining the one or more parking characteristics comprises defining the plurality of parking spaces to form a grid arrangement in which parking space dimensions alternate by row or column based on vehicle types of the plurality of vehicles, and wherein the one or more parking characteristics of the parking lot comprises one or more parking space widths of the plurality of parking spaces, one or more parking space lengths of the plurality of parking spaces, a number of the plurality of parking spaces, an arrangement of the plurality of parking spaces, or a combination thereof; and controlling a movement of the plurality of vehicles via the exit lane, the entry lane, and the one or more charging lanes based on the vehicle data and the one or more parking characteristics of the parking lot.

19. The method of claim 18 further comprising:

obtaining charging station data associated with a plurality of charging stations disposed proximate to the one or more charging lanes;

determining, based on the one or more electrical charging characteristics of the vehicle data, whether a given vehicle from among the plurality of vehicles has a given amount of electrical energy that is less than a threshold amount of electrical energy; and in response to determining that the given amount of electrical energy is less than the threshold amount of electrical energy:

identifying a given charging station from among the plurality of charging stations based on the charging station data; and controlling a movement of the given vehicle to travel to the given charging station along a given path defined by the exit lane and the one or more charging lanes.

20. The method of claim 18 further comprising:

determining whether a given parking space from among the plurality of parking spaces is available based on the parking lot data; and controlling, in response to determining the given parking space is available, a movement of a given vehicle from among the plurality of vehicles to travel to the given parking space along a given path defined by the entry lane, the one or more charging lanes, or a combination thereof.

* * * * *